United States Patent
Poppe et al.

(10) Patent No.: US 8,262,332 B2
(45) Date of Patent: Sep. 11, 2012

(54) CONNECTING ELEMENT, IN PARTICULAR A SPEED NUT

(75) Inventors: Andreas Poppe, Bremen (DE); Hermann Benthien, Sottrum (DE)

(73) Assignee: Airbus Operations GmbH, Hamburg (DE)

( * ) Notice: Subject to any disclaimer, the term of this patent is extended or adjusted under 35 U.S.C. 154(b) by 197 days.

(21) Appl. No.: 12/539,191

(22) Filed: Aug. 11, 2009

(65) Prior Publication Data

US 2010/0040433 A1    Feb. 18, 2010

Related U.S. Application Data

(60) Provisional application No. 61/089,726, filed on Aug. 18, 2008.

(51) Int. Cl.
F16B 37/04    (2006.01)
(52) U.S. Cl. .......................................... 411/183; 411/37
(58) Field of Classification Search .................. 411/183, 411/34, 501, 37
See application file for complete search history.

(56) References Cited

U.S. PATENT DOCUMENTS

| | | | |
|---|---|---|---|
| 1,513,637 A | | 8/1922 | Schwartz |
| 2,360,274 A | * | 10/1944 | Rapp ............................ 411/302 |
| 2,371,927 A | * | 3/1945 | Schmidt et al. ............... 411/303 |
| 3,131,743 A | | 7/1961 | Hinkle |
| 3,797,358 A | | 3/1974 | Allender |
| 4,875,815 A | | 10/1989 | Phillips, II |
| 4,913,609 A | * | 4/1990 | Mauer ............................ 411/43 |
| 6,487,767 B1 | | 12/2002 | Reid et al. |
| 6,854,943 B2 | * | 2/2005 | Nagayama ..................... 411/429 |
| 2003/0026673 A1 | | 2/2003 | Filipp |

FOREIGN PATENT DOCUMENTS

| | | |
|---|---|---|
| DE | 10134375 A1 | 1/2003 |
| FR | 878521 | 1/1943 |
| FR | 2756023 A1 | 5/1998 |

OTHER PUBLICATIONS

German Office Action for DE 10 2008 041 315.1 dated Jan. 13, 2012.

* cited by examiner

*Primary Examiner* — Gary Estremsky
(74) *Attorney, Agent, or Firm* — Jenkins, Wilson, Taylor & Hunt, P.A.

(57) ABSTRACT

The invention relates to a connection element, in particular a plate nut, comprising a base body for attachment of an arbitrary component to a metallic planar object, in particular to a sheet metal.
According to the invention, the base body comprises a securement portion the cross-sectional geometry of which deviates from a circular shape, the securement portion being at least partially positively receivable in a deformation in the sheet metal. The base body is, by means of a holding device, secured in the deformation against dropping out.
In an alternative embodiment of the connection element, wherein unilateral accessibility to the sheet metal is sufficient, the holding device is formed by bead portions in a shaft area of the base body, which are plastically deformed into a bead by pull-out of a threaded bolt that is screwed into a thread portion.
In accordance with a further embodiment the holding device is formed by a threaded nut engageable on the underside with the base body of the connection element or/and snappable onto the same, bilateral accessibility to the sheet metal however being required.

14 Claims, 4 Drawing Sheets

CONNECTING ELEMENT, IN PARTICULAR A SPEED NUT

CROSS-REFERENCE TO RELATED APPLICATIONS

This application claims the benefit of U.S. Provisional Application No. 61/089,726, filed Aug. 18, 2008, the entire disclosure of which is herein incorporated by reference.

FIELD OF THE INVENTION

The invention relates to a connecting element comprising a basic body for connecting a component to a metallic planar structure, in particular a metal sheet.

Rivet nuts are generally used to implement screw connections on thin metal aircraft sheets. A typical rivet nut comprises a metal support sheet, into which a nut is snapped or latched to connect the component. To complete the connection, the metal support sheet is then riveted to the fuselage cell structure.

The drawbacks in this type of rivet nuts are inter alia the stress concentration owing to the two rivets, the increased space requirement because of the multi-part mode of construction and the weight caused by this. Regardless of this, a riveting of the metal support sheets using flush head rivets requires a minimum thickness of the metal sheet, which generally exceeds the statically necessary minimum dimension and this is usually the greatest drawback.

Furthermore, fastening systems with rivet nuts are known ("ForceTec®"), in which the metal support sheet is part of a flange bushing, which is installed in the bolt hole. As a result, a relatively low weight is achieved with simultaneously low fatigue behaviour over the entire service life of the connection. The drawbacks, however, in this system are the multi-stage work sequence and the high costs.

SUMMARY OF THE INVENTION

The object of the invention is to provide a connecting element which substantially avoids the drawbacks mentioned above in the fastening of known rivet nuts to thin metal sheets.

This object is achieved by a connecting element with the features of claim 1.

Since the basic body has a securing portion, the cross-sectional geometry of which differs from the circular shape and which can be positively received, at least in regions, in an opening in the sheet metal, the basic body being secured against falling out by means of a holding device in the opening, a high resistance capacity of the connecting element is produced relative to torques, which are caused, for example, when screwing in a fastening bolt to connect an external component or by the fastened component. The connecting element is prevented from rotating by a non-round securing portion, which is located positively, at least in regions—but preferably with the provision of a complete positive fit—in the opening of the metal sheet formed to correspond with this. The opening which is non-round, for example elliptical, oval or, at least in two portions, curved as desired, within the metal sheet may be produced by means of a punching tool, for example.

The holding device prevents the connecting element from falling out in the vertical direction. To place the connecting element in a first embodiment variant, a one-sided access to the metal sheet is sufficient, so that it is possible, for example, to fasten the connecting element to hollow bodies, hollow profiles or similar components within the fuselage cell structure of an aircraft. In addition, the outlay for assembly is reduced in comparison to multi-component fastening elements.

Regardless of this, the connecting element according to the invention, in contrast to many previously known technical solutions in this field, can be universally used for sheet metals with a material thickness of between 0.5 mm and 5 mm.

In one embodiment variant, the connecting element is formed by a metallic material, for example a high-strength aluminium alloy, a titanium alloy, a high-grade steel alloy or pure titanium. A further embodiment variant can be produced by fibre-reinforced plastics materials, in particular.

A development of the connecting element provides that the cross-sectional geometry of the securing portion has at least two portions with a different curvature, in particular, is configured in an oval or an elliptical manner, to prevent the basic body rotating in the opening.

Owing to the non-round securing portion and the correspondingly configured opening, a high torque resistance of the connecting element in the metal sheet is achieved with a simultaneously good resistance capacity of the connection produced against symptoms of fatigue over the entire service life of the aircraft.

According to a further advantageous configuration, it is provided that the holding device is formed by a bead, which can be configured by a plastic deformation of a bead portion of the basic body.

The positional fixing of the connecting element in the metal sheet takes place in that the sheet metal is clamped between the bead extending underneath and a collar of the connecting element cooperating at the top with the metal sheet. As a result of the irreversible plastic deformation process to form the bead, an automatic detaching of the connecting element, for example owing to the effect of shocks, fatigue symptoms or the action of tensile forces, is ruled out. Moreover, a high resistance capacity relative to symptoms of fatigue of any type is provided by the bead.

According to a further advantageous configuration, the unshaped bead portion has a hollow cylindrical cross-sectional geometry.

As a result, the threaded mandrel used to expand the bead portion may have a standard, circular cross-sectional geometry.

A further advantageous development of the connecting element provides that the basic body has a threaded portion, into which a threaded mandrel can be screwed, wherein the bead can be shaped by a movement in opposite directions between the threaded mandrel and a counter support.

As a result, placing of the connecting element is made possible by relatively simply constructed tools which are light and can also be handled manually.

To create the bead, a threaded mandrel is screwed into the connecting element and a counter support is placed on the upper side of the metal sheet. The threaded mandrel is then moved or drawn by means of a suitable tool in the opposite direction by to the counter support, with the formation of a peripheral bead below the metal sheet taking place as a result of a plastic deformation of a bead portion of the connecting element. The tool can move the thread mandrel, for example, by means of an electric actuating drive or by means of a hydraulic drive unit. The tool may have a device for the preadjustment of the necessary tensile force as a function of a metal sheet thickness. On reaching the preselected tensile force, the tightening process is automatically ended. In an advantageous manner, the counter support is configured as an integral component of the tool used to tighten the threaded mandrel. The threaded mandrel is received, for example, by means of a chuck on the pulling tool in order to be able to replace and clamp different threaded mandrels.

A further advantageous configuration of the connecting element provides that an end portion of the basic body is open, or closed for sealing.

The open configuration of a threaded portion has the advantage, in particular, that longer fastening bolts can be screwed from the upper side of the metal sheet into the connecting element, as long as these do not come into undesired contact on the inside with a further component. The closed embodiment variant of the lower threaded portion allows the provision of a hermetically sealed connection. For this purpose, the lower threaded portion of the connecting element is preferably formed hemispherically, but may also have a surface shape which differs from this.

A development of the connecting element provides that the basic body has a collar, which is positively received, at least in regions, in a peripheral crimp or a countersink of the opening.

Owing to the collar, in conjunction with the bead produced by a plastic deformation, the positional fixing of the connecting element takes place primarily in the vertical direction. In the case of metal sheets with a small material thickness of, for example, less than 2 mm, for secure fastening of the connecting element, the production of a crimp running around the non-round opening is advantageous, as owing to the securing portion in conjunction with the opening reveal, no adequately high prevention of rotation can be achieved. However, the effect of the securing portion is assisted by the crimp with the collar positively resting therein. In the case of metal sheets with a higher material thickness, instead of a crimp, the edge region of the opening may be provided with a countersink. The function of the countersinking corresponds here to the purpose of the crimp.

According to a further advantageous development, it is provided that the collar of the connecting element terminates flush with the upper side of the metal sheet.

This allows a level upper side of the metal sheet to be achieved in the region of the fastening element and this may be desired, for example for aerodynamic or aesthetic reasons. Deviating from this, the collar of the connecting element may also be configured in such a way that it rests above the upper side of the metal sheet with the formation of a shoulder, in other words, is not countersunk. This alternative embodiment of the connecting element is advantageous, in particular, to transfer higher forces.

A further configuration provides that the collar with the bead portion, on the one hand, and the threaded portion, on the other hand, are separate components, which can be connected to one another, in particular can be coaxially plugged together, the bead portion and/or the collar being formed by a metallic material which is softer in comparison to the threaded portion.

As a result, a mechanically highly loadable connection can be achieved between the connecting element and an external component by means of a screwed-in connecting bolt and, simultaneously, the tensile force required to shape the peripheral bead may be reduced in a defined manner by the use of a softer metal.

A further advantageous configuration of the connecting element provides that the holding device is a threaded nut which can be latched underneath to the basic body.

This embodiment of a connecting element, in contrast to the first embodiment variant according to claim 1, is configured with a threaded nut which can be latched to a basic body and therefore latched thereto underneath, two-sided access to the metal sheet being required, however. The connection between the basic body also positively received at the top in a non-round opening of the metal sheet to the (snap-in) threaded nut arranged in the region of the lower side of the metal sheet takes place, for example, by means of two latching noses, which cooperate with lateral recesses in the threaded nut. The advantage of this embodiment variant is, in particular, that a rapid, tool-free fastening is possible and, in addition, the connecting element can also be detached again if necessary.

The connecting element according to this embodiment variant is advantageously formed by plastics material, in particular a fibre-reinforced plastics material.

Further advantageous embodiments of the connecting element are described in the following claims.

BRIEF DESCRIPTION OF THE DRAWINGS

In the drawings:

FIG. 2) in the shaped state, FIG. 7 shows a cross-sectional view of a further two-part embodiment variant of the connecting element with a basic body and a threaded nut for snapping in.

DETAILED DESCRIPTION OF THE DRAWINGS

Figure 1:
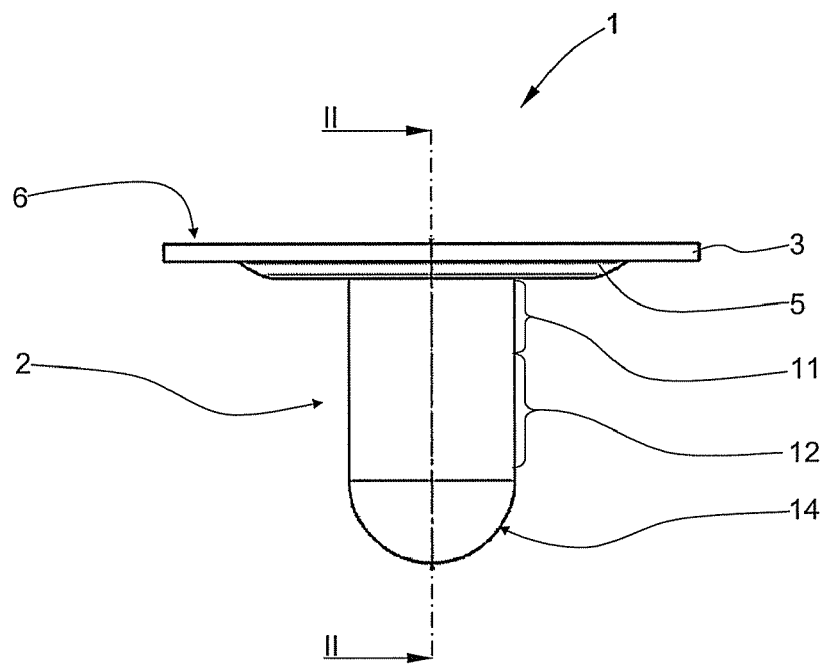
FIG. 1 shows a side view of the non-shaped connecting element positioned in an opening in a metal sheet.

The same structural elements in each case have the same reference numeral in the drawings.

Figure 2:
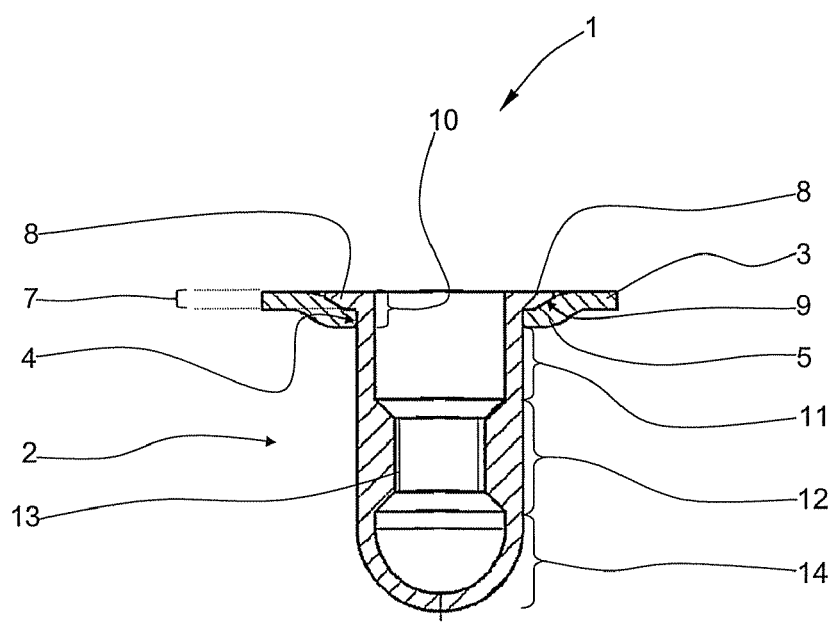
FIG. 2 shows a sectional view of the non-shaped connecting element inserted in a metal sheet along the section line II-II in FIG. 1.

FIG. 1 shows a non-sectional side view of the unshaped connecting element inserted in an opening, while FIG. 2 shows the connecting element in the same state, but illustrated in a cross-sectional view along the section line II-II in FIG. 1.

A connecting element 1 or a universal speed nut configured according to the invention for different sheet metal thicknesses inter alia has a basic body 2, which is inserted in a metal sheet 3. A non-round opening 4 is introduced into the metal sheet 3 and the inner edge region thereof is provided with a peripheral crimp 5, the level of which in relation to an upper side 6 of the metal sheet 3 is countersunk by a depth 7 in order to achieve a flush termination of the connecting element 1 with the upper side 6 of the metal sheet 1. Preferably, the contour of the non-round opening 4 follows an elongate oval or an ellipse to achieve the desired prevention of the connecting element from rotating in the metal sheet 3—optionally in conjunction with an optional crimp or countersinking. Basically, the opening 4 may be provided with virtually any conceivable geometric shape, although curvature radii which are too small or edges which are too sharp should be avoided in view of fatigue prevention. The contour of the opening 4 preferably has at least two portions each with a different curvature. The opening 4 can be introduced into the metal sheet 3, for example, by means of a suitable punching tool, not shown in the figures.

A collar 8 of the connecting element 1 positively rests on the crimp 5, at least in regions. For this purpose, the collar 8 is peripherally provided with a slightly inclined bevel 9, so a flush termination with the upper side 6 of the metal sheet 3 is ensured.

Figure 3:
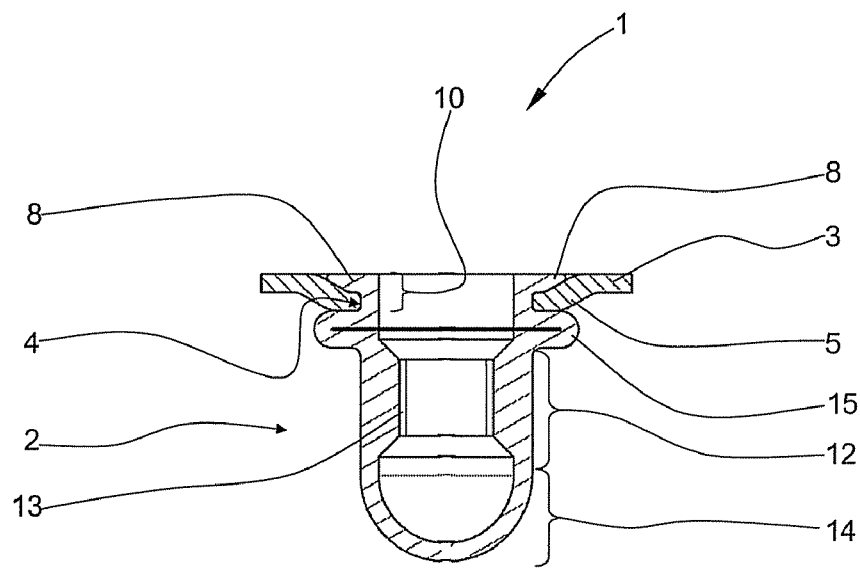
FIG. 3 shows a sectional view of the connecting element (cf.

The basic body 2 furthermore has a non-round securing portion 10, the peripheral contour of which positively rests on the opening 4, at least in regions, in order to prevent the connecting element 1 from rotating in the metal sheet 3. For this purpose, the securing portion 10 has, for example, an oval, an elliptical or other curvature of contour, which corresponds with the opening contour. A bead portion 11 adjoins the securing portion 10 towards the bottom. The bead portion 11 is the region of the connecting element 1 in which a predefined, plastic deformation is implemented to fasten the connecting element 1 in the metal sheet 3 by means of a threaded mandrel, not shown in FIGS. 1 to 4, and a pulling tool, in a similar manner to "pop riveting tongs". A threaded portion 12 with an inner thread 13 also adjoins the bead portion 11. The inner thread 13 is, on the one hand, used for screwing in a threaded mandrel (cf. FIGS. 5, 6) to allow the shaping of the connecting element 1 by the action of a tensile force on the threaded mandrel and the bead portion and, on the other hand, to screw in a connecting bolt, also not shown, for fastening an external component to the metal sheet 3. The threaded portion 12 passes into an end portion 14. The end portion 14, as illustrated in FIG. 1 to 3, may have a hemispherical form or a level form (cf., in particular FIGS. 5, 6) in order to simultaneously bring about a hermetic sealing or making tight of the connecting element 1. The connecting element 1 can thus also be used, for example, for fastening components to thin-walled fuel or hydraulic tanks or the like. Alternatively, the end portion 14 may simply be open at the bottom, in other words practically be an extension of the threaded portion 12. In this constellation, a fastening bolt can be screwed completely through the threaded portion 12.

Only the collar 8 or flange and the securing portion 10 have a contour which differs from the circular shape. The bead portion 11, the threaded portion 12 and the end portion 14, on the other hand, have a substantially hollow cylindrical cross-sectional geometry.

Figure 4:
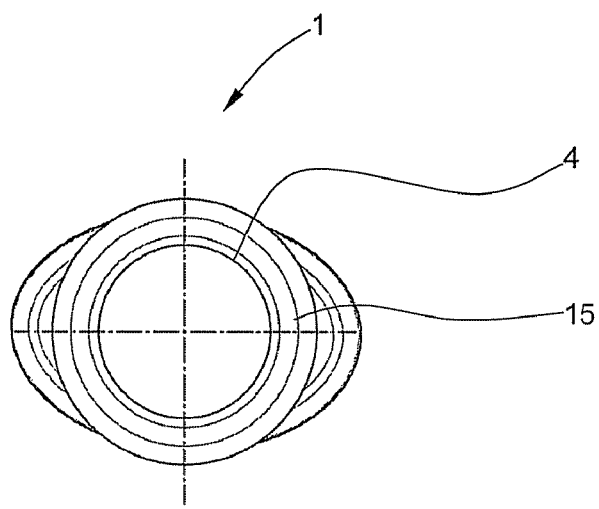
FIG. 4 shows a view from below of the shaped connecting element according to FIG. 3.

FIGS. 3, 4 illustrate the connecting element 1 in the plastically shaped final state. FIG. 3 corresponds—except for the shaping process that has taken place—to the view of FIG. 2, while, in FIG. 4, a plan view from below of the already shaped connecting element 1 according to FIG. 3 is shown.

The bead portion 11 is transformed by plastic deformation into a bead 15. The sheet metal 3 is firmly clamped between the bead 15 and the collar 8. The connecting element 1 is prevented from carrying out an undesired rotation during the screwing in of a connecting bolt into the threaded portion 12 by the non-round securing portion 10 in conjunction with the positive fit between the collar 8 and the crimp 5. The connecting element 1 is prevented from being pulled out or falling out when tensile stresses result from the bead 15 in conjunction with the collar 8. The hemispherical end portion 13 ensures the hermetic sealing of the connecting element 1 relative to gases and/or liquids passing through.

The crimp 5 may be advantageously used, in particular in the case of a metal sheet 3 with a small material thickness, as a countersinking of the opening 4 in the case of small thicknesses is generally not possible. In contrast, in the case of metal sheets with a high material thickness, a flush connection of the connecting element 1 can be achieved without problems, for example by conical countersinking. Alternatively, it is possible in the case of small metal sheet thicknesses to equip the collar 8 of the connecting element 1, instead of the bevelled or slightly chamfered embodiment according to FIG. 1 to 4, with a rectangular cross-section, which rests, when the connecting element 1 is positioned, on the upper side 6 of the metal sheet 3 with the formation of a shoulder. The advantage of this variant is, in particular, that a collar with a rectangular cross-section can absorb higher tensile or pressure loads than the peripherally slightly chamfered or bevelled collar 8.

The connecting element 1 integrally configured in the variant according to FIG. 1 to 4 is preferably formed by a metallic material, for example an aluminium alloy, a titanium alloy, a high-grade steel alloy or pure aluminium or pure titanium.

Figure 5:
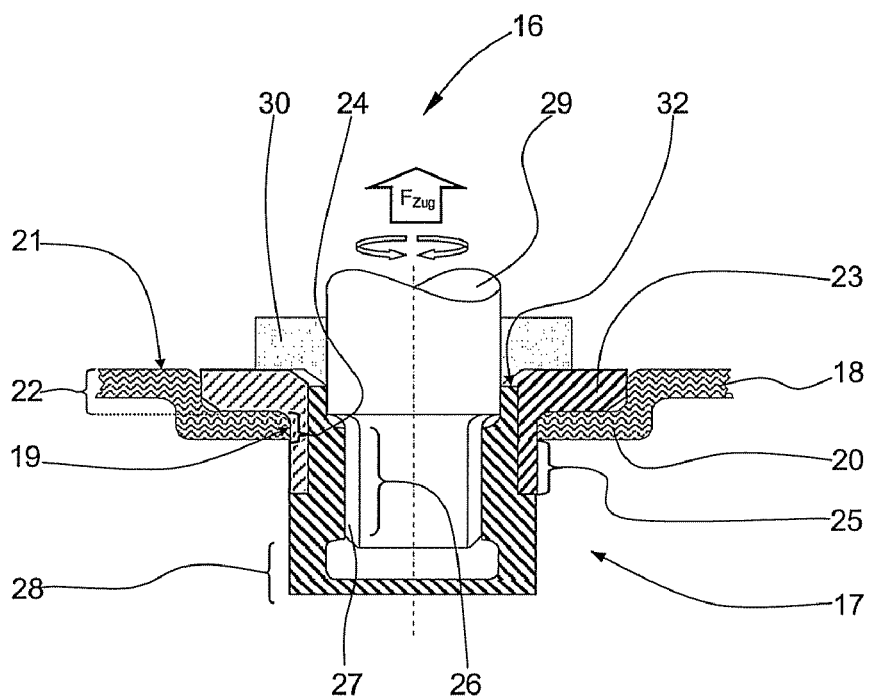
FIG. 5 shows a schematic cross-sectional view of a two-part and non-shaped embodiment variant, inserted in a metal sheet, of the connecting element.
Figure 6:
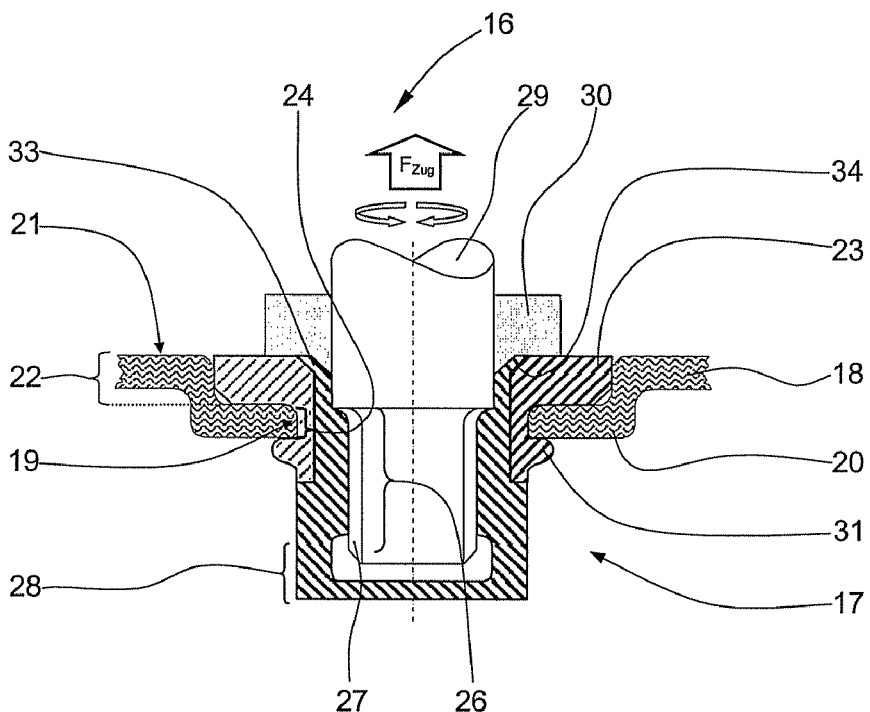
FIG. 6 shows the variant of the connecting element according to FIG. 5 in the shaped state.

FIGS. 5 and 6 illustrate, in a schematic cross-sectional view, a variant of the connecting element 1 according to the invention which, in contrast to the embodiment variant according to FIG. 1 to 4, is two-part.

A connecting element 16 has a basic body 17, which is provided to be received in a metal sheet 18. Introduced into the metal sheet 18 is, again, an opening 19 with a crimp 20 running in the edge region, with regard to the more detailed description of which reference is made to the embodiment in the description of FIG. 1 to 4. In order to achieve a flush termination, in the ideal case, of the connecting element 1, a depth 22 of the crimp 20 is selected such that it coincides approximately with a material thickness of the collar 23. The collar 23 is, in contrast to the embodiment according to FIGS. 1 to 4, not bevelled or inclined inwardly, but has an approximately rectangular cross-section with merely rounded edges. A securing portion 24, with the provision of a preferably complete positive fit, rests on the opening 19 to ensure the required prevention of the connecting element 16 from rotating in the metal sheet 18. A bead portion 25, in which the actual plastic deformation takes place during the fastening process of the connecting element 16 in the metal sheet 18, adjoins the securing portion 24 of the collar 23. The collar 23, in the unshaped state of the connecting element 16, can be pushed onto a threaded portion 26 which, in contrast to the embodiment according to FIG. 1 to 4, in this variant, is a separate component. The threaded portion 26, in a known manner, contains an inner thread 27 and is provided with a planar end portion 28 for hermetic sealing.

To place the connecting element 16, a threaded mandrel 29 is firstly screwed into the threaded portion 26, as indicated by the opposing rotary arrows and a counter support 30 coaxially surrounding the threaded mandrel 29, for example, is placed on the upper side 21 of the metal sheet 18. To carry out the shaping process, the threaded mandrel 29 and the counter support 30 are moved in opposite directions to one another with the application of a tensile force $F_{tensile}$, so the plastic deformation of the bead portion 25 into a bead 31 takes place. Apart from the primary shaping of the bead portion 25, a slight shaping of an upper edge 32 of the threaded portion 26 occurs, which leads to a shaping of a peripheral interstice 33, which positively rests on an outwardly directed inner bevel 34 of the collar, so the threaded portion 26 is secured against falling out of the collar 23.

A significantly softer and therefore easier to shape material is preferably used for the collar 23 than for the threaded portion 26, so the shaping process is facilitated and, simultaneously, a mechanically more highly loadable connection becomes possible between the threaded portion 26 and a fastening bolt to be screwed therein for an external component. The possibility of a different material selection for the collar 23 and the threaded portion 26 is the central advantage of this embodiment variant compared to that according to FIG. 1 to 4.

Both the threaded mandrel 29 and the counter support 30 may be integral components of a pulling tool, not shown in more detail and preferably operable by hand. To receive and clamp the threaded mandrel 29, the pulling tool has suitable, fully automatic clamping devices. The pulling tool is preferably hydraulically and/or electrically driven, a force measuring device indicating the current tensile force, and an open-loop and closed-loop control device allowing, as a function of the force measurement values, an automatic ending of a successfully completed shaping process and the adjustment of different limit values for the tensile force $F_{tensile}$ for various connecting elements.

Figure 7:
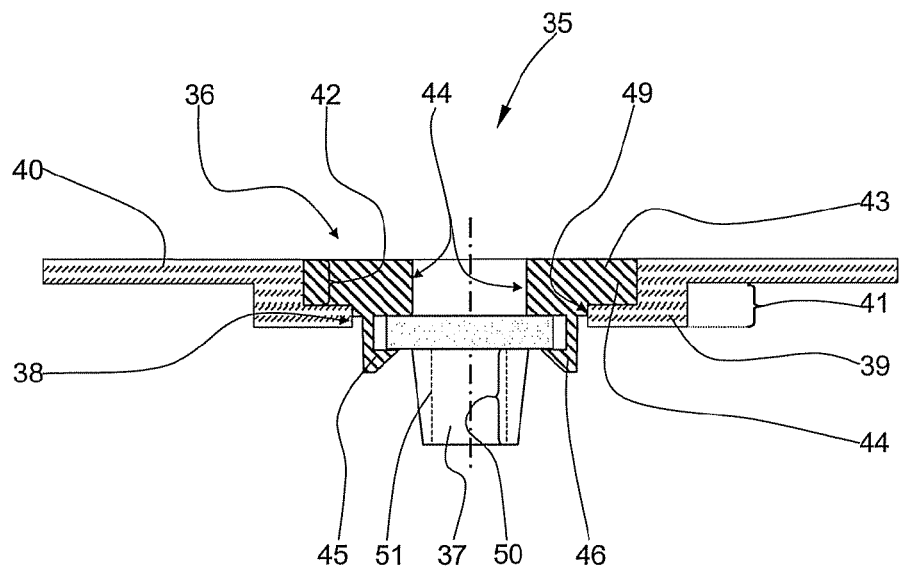
Figure 8:
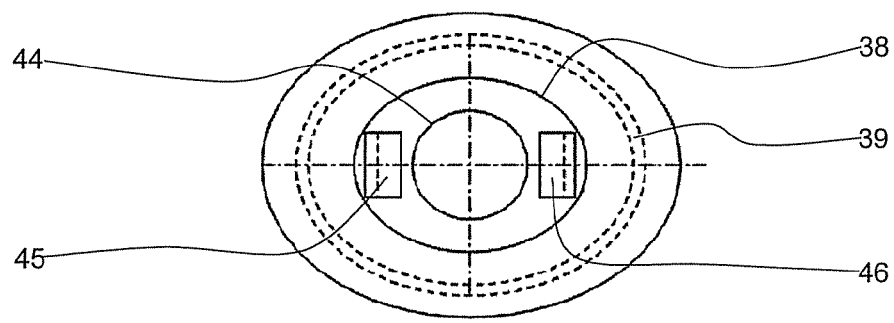
FIG. 8 shows a view from below of the embodiment variant of the connecting element according to FIG. 7.
Figure 9:
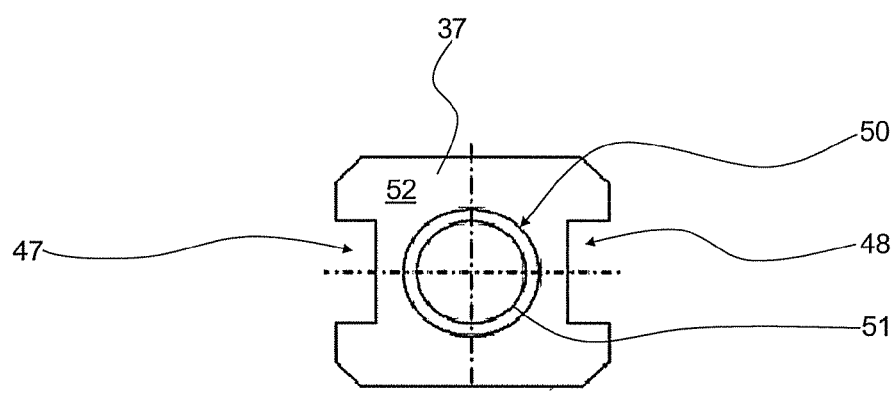
FIG. 9 shows a plan view of the threaded nut for snapping in according to FIGS. 7, 8.

FIG. 7 to 9 illustrate, in a highly schematic or part sectional view, a further embodiment variant of the connecting element according to the invention.

FIG. 7 shows a schematic cross-sectional view in principle of a complete connecting element with a basic body and a (snap-in) threaded nut, FIG. 8 illustrates a view from below of the connecting element according to FIG. 7, but without a threaded nut, and FIG. 9 finally illustrates, in an isolated manner, the threaded nut in a plan view. In a further continuation of the description, reference is simultaneously made to FIG. 7 to 9.

A connecting element 35 inter alia comprises a basic body 36 with a threaded nut 37. The threaded nut 37 is received, with the provision of a preferably complete positive fit, in an opening 38 which is in turn non-round, in other words deviating from the circular shape, this opening also being provided in the edge region with a crimp 39. The, for example, oval or elliptical opening 38 and the crimp 39 may be configured in a metal sheet 40, for example by punching and/or so-called "nippling in" or "crimping in". Owing to this positive fit, at least in regions, between the basic body 36 and the opening 38 or the crimp 39 and the collar 43, rotation of the basic body 36 when screwing a fastening bolt, not shown, into the threaded nut 37 is prevented. With regard to the detailed forming of the opening 38 and the crimp 39, reference is made to the explanation already given with respect to FIG. 1 to 6.

A depth 41 of the crimp 39 corresponds approximately to a height 42 of a collar 43 of the basic body 36. The basic body 36 is prevented from falling through the opening 38 by means of the collar 43 which rests, at least in regions, on the crimp 39. A thread-free cylindrical hole 44 is introduced into the basic body 36 and is used to guide the fastening bolt through. Two latching noses 45, 46 configured integrally with respect to the basic body 36 and arranged therebelow, as holding devices, may be connected in a latching manner to the (snap-in) threaded nut 37 by simply snapping into two correspondingly configured recesses 47, 48 and prevent the threaded nut 37 from falling out when the fastening bolt is completely unscrewed. The basic body 36 also has a securing portion 49 by means of which the basic body 36 is reliably prevented from rotating in cooperation with the opening 38 configured positively with respect to this, at least in regions. The threaded nut 37 has a threaded portion 50, which is provided with an inner thread 51. Because of the snap-in mechanism, the connecting element 35, in comparison to the other embodiment variants, does not need a shapeable bead region to provide a bead. The securing of the threaded nut 37 against falling out takes place in that the crimp 39 is clamped between the collar 43 of the basic body 36 and a contact face 52 of the threaded nut. The contact face 52 has an approximately square basic face with slightly bevelled edges, the contact face 52 being selected to be significantly larger than a face of the cylindrical hole 44 to prevent the threaded nut 37 from being pulled through or falling down in the event of a tensile loading of the connecting element 35. In contrast to the previous embodiment variants of the connecting element 35, in the connecting element 35 according to FIG. 7 to 9, access to the metal sheet 40 on both sides is necessary, however, to allow the snapping of the nut 37 from the lower side onto the basic body 36 inserted beforehand from the other side of the metal sheet 40 into the opening 38.

The connecting element 35, in accordance with the previous embodiment variants, may be formed by a metallic material and/or, differing therefrom, may also be formed by a plastics material having a fibre reinforcement, in particular.

In particular if an electric contact is to be produced by means of the connecting element 35 between the metal sheet 40 and a connecting bolt screwed into the threaded nut 37, it is recommended that the contour of the opening 38 and, accordingly, that of the crimp 39 be matched to a rectangle with rounded edges and slightly curved sides, as a contact face, not shown, between the basic body 36, which is electrically conductive in this case, with the collar 43, on the one hand, and the crimp 39 or the metal sheet 40, on the other hand, is increased by this and consequently electric line losses are reduced in comparison to the shape according to FIG. 7 to 9. As a result of the relatively angular contour, in this case approximating an elongate rectangle, of the opening 38, resistance to fatigue symptoms (so-called "fatigue") is impaired in this application, however.

LIST OF REFERENCE NUMERALS 1 connecting element
2 basic body (connecting element)
3 metal sheet
4 opening (metal sheet)
5 crimp
6 upper side (metal sheet)
7 depth (crimp)
8 collar
9 bevel
10 securing portion
11 bead portion
12 threaded portion
13 inner thread
14 end portion
15 bead
16 connecting element
17 basic body
18 metal sheet
19 opening (metal sheet)
20 crimp
21 upper side (metal sheet)
22 depth (crimp)
23 collar
24 securing portion (collar)
25 bead portion (collar)
26 threaded portion
27 inner thread (threaded portion)
28 end portion (end portion)
29 threaded mandrel
30 counter support
31 bead
32 upper edge
33 interstice
34 inner bevel
35 connecting element
36 basic body 37 threaded nut
38 opening
39 crimp
40 metal sheet
41 depth (crimp)
42 height (collar)
41 collar
42 cylindrical hole
43 collar
44 cylindrical hole
45 latching nose
46 latching nose
47 recess
48 recess
49 securing portion
50 threaded portion
51 (inner) thread
52 contact face (threaded nut)

The invention claimed is:

1. A connecting element comprising:
a basic body comprising:
a non-round securing portion,
a threaded portion, and
a collar, and
at least one of a plurality of holding devices,
wherein the collar and the threaded portion are coaxially connected to one another,
wherein a metallic material of the collar is softer than a metallic material of the threaded portion,
wherein the collar is capable of being received in an opening having a peripheral crimp or a countersink,
wherein the basic body is adapted to be secured against falling out of the opening by the at least one of a plurality of holding devices in the opening, and
wherein at least one of the plurality of holding devices comprises a peripheral contour, configured in at least one of an oval and elliptical manner to prevent a rotation of the basic body in the opening.

2. The connecting element according to claim 1, wherein at least one of the holding devices is a bead portion collar.

3. The connecting element according to claim 2, wherein the bead portion has a hollow cylindrical cross-sectional geometry.

4. The connecting element according to claim 2, wherein a threaded portion comprising an inner thread is capable of receiving a threaded mandrel, and wherein the bead portion is capable of being shaped by a movement between the threaded mandrel and a counter support.

5. The connecting element according to claim 1, wherein an end portion of the basic body is adapted to be one of open, and closed.

6. The connecting element according to claim 1, wherein the collar is adapted to terminate flush with an upper side of a metal sheet.

7. The connecting element according to claim 6, wherein said collar resting on the metal sheet, is adapted to form a shoulder on an upper side of the metal sheet.

8. The connecting element according to claim 1, wherein the connecting element at least in portions comprises a metallic material, and wherein said metallic material is one of an aluminum alloy, a titanium alloy, a high-grade steel alloy and titanium.

9. The connecting element according to claim 1, wherein the at least one of the plurality of holding devices comprises a threaded nut, and wherein the threaded nut is adapted to be latched underneath the basic body.

10. The connecting element according to claim 9, wherein at least two latching noses, which can be brought into engagement with at least two recesses in the threaded nut, are arranged on the basic body.

11. The connecting element according to claim 1, wherein the connecting element is a speed nut.

12. The connecting element of claim 1, wherein the basic body is adapted to be secured against falling out of the opening by a threaded nut, and wherein at least two latching noses capable of being engaged with at least two recesses in the threaded nut, are arranged on the basic body.

13. The connecting element of claim 12,
wherein at least one of the basic body and the threaded nut is formed by at least one of a plastics material, and a fibre-reinforced plastics material.

14. The connecting element of claim 1, wherein the basic body comprises a hole adapted to receive a fastening bolt for a component to be fastened.

* * * * *